Patented Mar. 15, 1927.

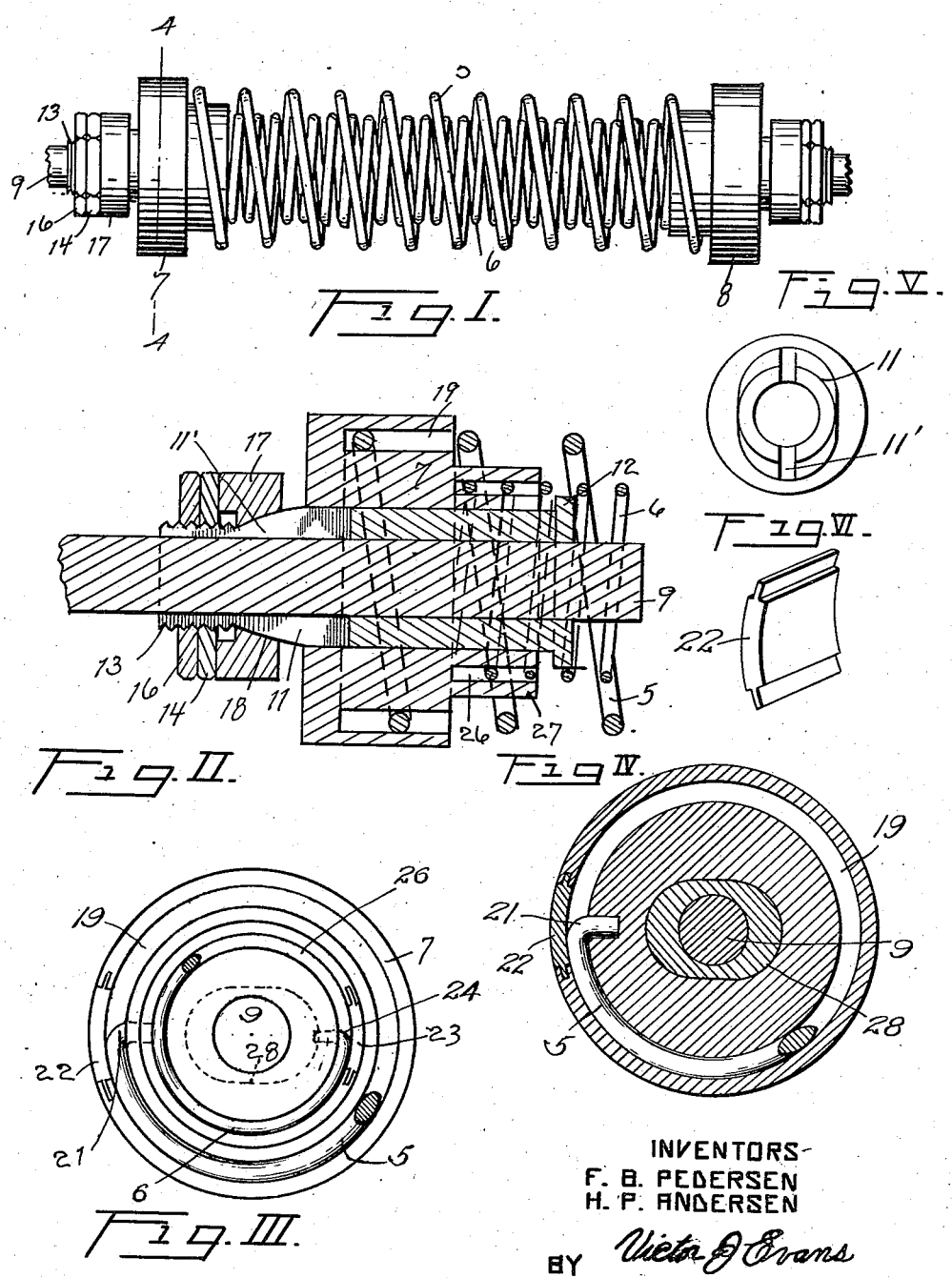

1,621,428

UNITED STATES PATENT OFFICE.

FLORIAN BERTRAM PEDERSEN AND HANS PETER ANDERSEN, OF ALAMEDA, CALIFORNIA.

UNIVERSAL JOINT.

Application filed April 11, 1925. Serial No. 22,403.

This invention relates to improvements in universal joints and has particular reference to a device whereby the ends of two shafts may be connected one to the other when they are in alignment or at an angle to each other.

The principal object of this invention is to produce a device of this character which is simple in construction and, therefore, cheap to manufacture.

Another object of this invention is to produce a device wherein the shafts may be rotated in either direction.

An additional object of this invention is to provide means whereby the shafts may be connected without the employment of a key or keyway cut in the ends of the shafts.

Other objects and advantages will be apparent during the course of the following description.

In the accompanying drawings forming a part of this specification, and in which like numerals are employed to designate like parts throughout the same, Figure 1 is a side elevation of our improved universal joint or flexible coupling.

Figure 2 is an enlarged detail cross section of one of the coupling elements,

Figure 3 is an end elevation of the spring retaining cup looking from the right of Figure 2.

Figure 4 is a sectional view taken on line 4—4 of Figure 1.

Figure 5 is an edge elevation of the sleeve.

Figure 6 is a perspective view of the latch for retaining the springs in operative association with the spring cups.

In the driving of shafting, it is often desirable to place one shaft slightly out of alignment with the adjacent end of another shaft section and to connect these ends so that power will be transmitted from one to the other. It has been customary to employ various means such as belts, knuckle-joints and the like for accomplishing this purpose. These structures have been expensive to manufacture and install.

We have, therefore, devised a coupling which is flexible and one which may be readily attached to the adjacent ends of two shafts in a few moments and without having to alter the shafts in any manner.

In the accompanying drawings wherein for the purpose of illustration is shown a preferred embodiment of our invention, the numeral 5 designates an outer spring element and the numeral 6 an inner spring element. The ends of these springs are positioned in spring cups which bear the numerals 7 and 8. As these cups and their associated parts are identical but one will be described.

By referring to Figure 2, it will be noted that the shaft 9 has clamped thereto a split sleeve 11, which sleeve is provided at one end with a head 12 and at its opposite end with a thread 13, upon which a nut 14 and a lock nut 16 are placed. The sleeve is split for a portion of its length as at 11'. These nuts bear against the tapered collar 17 which, in turn, bears against the cam surface 18 of the split sleeve 11. The result of this construction being that when the nuts 14 and 16 are tightened so as to force the tapered collar against this split sleeve, the same will be locked to the shaft 9. The sleeve 11 is elliptical in cross section, but, of course, may be made square or in any other convenient form, the purpose of which is to prevent rotation of the spring cups, with respect to the sleeves.

The spring cups are each provided with a channel 19 within which one end of the spring 5 is positioned. The end of the spring is bent as shown at 21 (see Fig. 3), and fits within a hole bored in the cup. In order to insert the end of the spring in its hole we have cut away a portion of the cup and inserted in place thereof a gate or latch 22 which may be removed and replaced at will, thus permitting the end of the spring to be inserted or withdrawn from its engagement with the cup.

A similar arrangement is shown at 23 to hold the end 24 of the spring 6. The end of this spring 6 is positioned in a channel 26 formed in the offset portion 27 of the collar 7. It will also be noted by viewing Figure 3 that an elliptical opening 28 is formed in the cup as above described.

In operation the ends of the shafts are inserted through the split sleeves after which the nuts 14 and 16 are tightened and the result will be that when one shaft is turned the springs will transmit the motion to the shaft to be driven and the angle between the ends of the shaft will be accommodated for by the flexibility of the springs.

It is to be understood that the form of our invention herewith shown and described is to be taken as a preferred example of the same, and that various changes in the shape, size and arrangement of parts may be resorted to without departing from the spirit of the invention or the scope of the subjoined claim.

Having thus described our invention, we claim:—

In a device of the character described the combination with a pair of shafts having their ends in close proximity to each other, a split sleeve secured to each of said shafts, means for contracting said sleeves, each of said sleeves having an elliptical outer periphery, a collar slidable on each of said sleeves, said collar having an elliptical opening formed there-through in such a manner that the opening there-through will cause a slidable engagement with the elliptical periphery of said sleeves, an inner spring having its opposite ends secured to said collars, and an outer spring having its opposite ends secured to said collars, said springs being coiled in reverse direction.

In testimony whereof we affix our signatures.

FLORIAN BERTRAM PEDERSEN.
HANS PETER ANDERSEN.